US 6,476,391 B1

(12) United States Patent
Zhang (10) Patent No.: US 6,476,391 B1
(45) Date of Patent: Nov. 5, 2002

(54) INFRARED IMAGING SYSTEM FOR ADVANCED RESCUE VISION SYSTEM

(76) Inventor: Evan Y. W. Zhang, 2552 Mahogany Tr., Centerville, OH (US) 45458

( * ) Notice: Subject to any disclaimer, the term of this patent is extended or adjusted under 35 U.S.C. 154(b) by 0 days.

(21) Appl. No.: 09/444,645

(22) Filed: Nov. 22, 1999

Related U.S. Application Data

(60) Provisional application No. 60/109,612, filed on Nov. 23, 1998.

(51) Int. Cl.$^7$ .................................................. G01J 5/00
(52) U.S. Cl. ...................................... 250/330; 359/356
(58) Field of Search ............................... 250/330, 338.1, 250/342, 349, 350, 353, 338.3; 359/350, 356

(56) References Cited

U.S. PATENT DOCUMENTS

| | | | |
|---|---|---|---|
| 4,449,787 A | | 5/1984 | Burbo et al. |
| 4,961,626 A | | 10/1990 | Fournier et al. |
| 5,089,914 A | * | 2/1992 | Prescott ...................... 359/815 |
| 5,302,830 A | * | 4/1994 | Shivanandan ............... 250/342 |
| H1599 H | | 10/1996 | Task et al. |
| 5,604,346 A | * | 2/1997 | Hamrelius et al. ........ 250/252.1 |
| 5,805,120 A | * | 9/1998 | Yamada et al. ................. 345/7 |
| 5,833,596 A | * | 11/1998 | Bonnell et al. ............. 600/109 |
| 5,838,489 A | * | 11/1998 | Erdmann .................... 359/357 |
| 5,949,582 A | * | 9/1999 | Coombs ...................... 359/630 |

FOREIGN PATENT DOCUMENTS

| | | | |
|---|---|---|---|
| JP | 4-370207 | * 12/1992 | ............ A42B/3/30 |

* cited by examiner

Primary Examiner—Constantine Hannaher
Assistant Examiner—Albert Gagliardi
(74) Attorney, Agent, or Firm—Bernard E. Franz (57) ABSTRACT

The system according to the invention uses cutting edge technologies such as Uncooled Staring Focal Plane detector Array, Hot Pressed Polycrystal Objective Lens, Helmet Mounted Display Using Transparent Image Combiner, and Neural Network Image Colorization and Recognition to dramatically enhance the system performance and reduce the weight and cost.

The helmet mounted infrared imaging system can:

Detect and recognize flames, humans and other objects,

Reduce the weight of the helmet components (including camera head and combiner) to less than 0.5 pounds,     View simultaneously visible and invisible surroundings without hindering operations.

Operate the imaging system hands-off; and

Transmit the imaging data to and receive the map from a remote sight.

Alternative Embodiment

In an alternative embodiment, the infrared camera is mounted centered in front of the display.

4 Claims, 6 Drawing Sheets

INFRARED IMAGING SYSTEM FOR ADVANCED RESCUE VISION SYSTEM

Priority is claimed of provisional patent application SN 60/109,612 filed Nov. 23, 1998, for an "Advanced Rescue Vision System". Said provisional application is hereby incorporated by reference and made a part hereof as though fully set forth.

The invention was made with Government support under a contract awarded by the Department of the Air Force. The Government has certain rights in this invention.

BACKGROUND OF THE INVENTION

1. Field of the Invention

The inventions relate to a head mounted or hand held infrared imaging system, and more particularly to an infrared imaging system for an advanced rescue vision system. One embodiment relates to a head mounted passive infrared imaging system; and another embodiment relates to an active head mounted or hand held infrared imaging system.

2. Background Information

Infrared means that the wavelength of infrared radiation is longer than visible light (from $0.38\ \mu$ to $0.78\ \mu$). Infrared light shares many of the properties of visible light, but its different wavelength has several unique characteristics. For instance, materials that are opaque to visible light may be transparent to infrared, and vice-versa. Infrared is much less subject to scattering and absorption by smoke or dust than visible, and infrared cannot be seen by human eye.

Also, unlike visible light, which is given off by ordinary objects only at very high temperatures, infrared energy is emitted by all objects at ordinary temperatures higher than $0°\ K$. This means that infrared energy is all around us all the time, even in the dark. Different objects give off varying amounts of infrared energy, depending on the temperature of the object and their emissivity. Passive IR cameras are designed to sense differing amounts of infrared energy coming from the various areas of a scene by focal plane array detector and to convert them to corresponding intensities of visible light by electronics for display purposes. This permits true see-in-the-dark capability as well as the ability to observe the thermal properties in all light conditions.

SUMMARY OF THE INVENTION

Passive System

A feature of the invention is a head mounted passive infrared imaging system for use in an advanced rescue vision system.

Objects of the invention include eliminating the operational deficiencies in hand held infrared imaging devices, reduce the cost and weight, provide for unimpeded wireless imagery signal transmission, have the imaging device voice activated, and provide for images that can be colored and identified by neural network chips.

Fire creates smoke and dust. A fire fighter can not see the fire and human being through smoke and dust, because the visible light with wavelength less than $0.78\ \mu$ is created by smoke and dust. However if a fire fighter has an Infrared Imager, he is able to see the fire and human being through smoke and dust because the smoke and dust can not scatter the infrared light with a wavelength longer than $1\ \mu$ emitted from fire and human being. In addition the IR imager also can see objects in complete darkness.

The system according to the invention uses cutting edge technologies such as Uncooled Staring Focal Plane detector Array, Hot Pressed Polycrystal Objective Lens, Helmet Mounted Display Using Transparent Image Combiner, and Neural Network Image Colorization and Recognition to dramatically enhance the system performance and reduce the weight and cost.

The helmet mounted infrared imaging system can:

Detect and recognize flames, humans and other objects,

Reduce the weight of the helmet components (including camera head and combiner) to less than 0.5 pounds, View simultaneously visible and invisible surroundings without hindering operations.

Operate the imaging system hands-off; and

Transmit the imaging data to and receive the map from a remote sight.

Alternative Embodiment

In an alternative embodiment, the infrared camera is mounted centered in front of the display.

DETAILED DESCRIPTION

Passive System

A. INTRODUCTION

Figure 1:
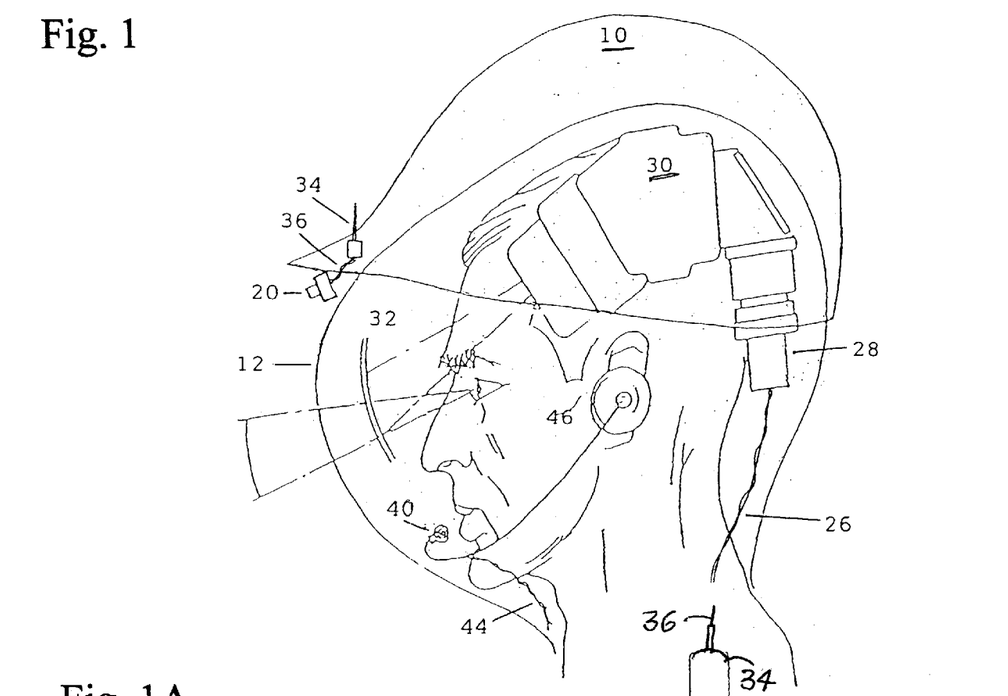
FIG. 1 is a pictorial view of a helmet mounted infrared imaging system.
Figure 1A:
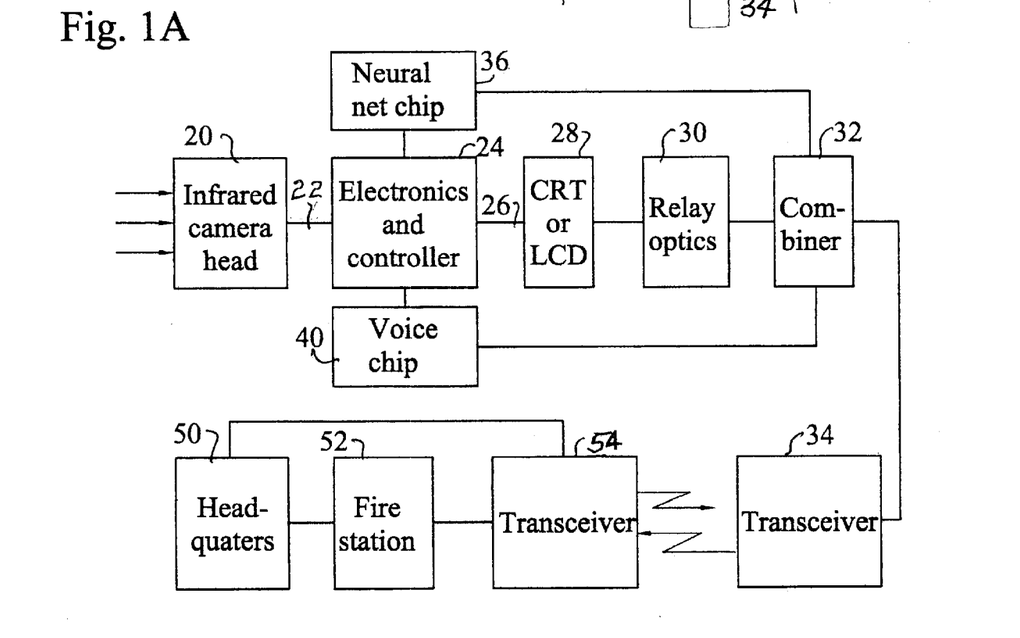
FIG. 1A is a block diagram of the passive infrared imaging system configuration shown in FIG. 1.

FIGS. 1 and 1A show a passive infrared imaging system configuration for fire-fighting applications; with FIG. 1 showing a helmet 10 having a visor 12, and FIG. 1A being a block diagram of the system. The system includes the following major components: Uncooled Infrared Imager, Video Processor, Neural Image Recognition Network, Helmet Mounted Display and Combiner, Voice Control and Wireless Image Transmission Unit.

Principle of Operation

Figure 3:
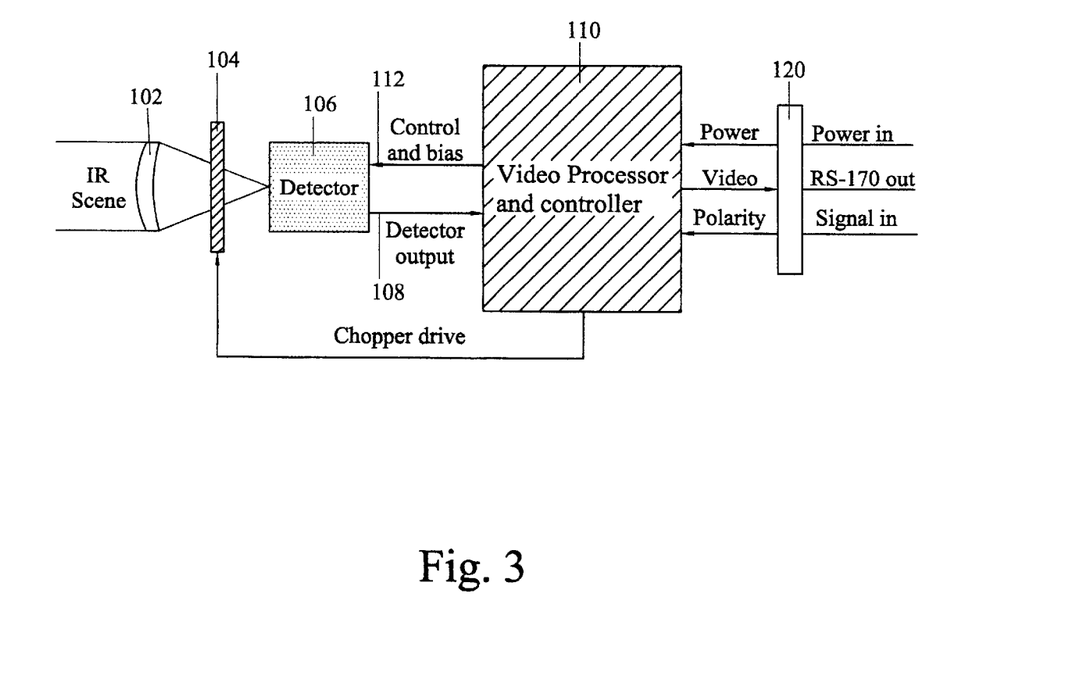
FIG. 3 is a block diagram of an IR camera.

The camera block diagram is shown in FIG. 3. The incoming infrared radiation is focused by the camera optics 102 on a focal plane detector array 106. The electronic output of the detector goes via line 108 to a video processor and controller 110, which converts into video signals for display. The video processor and controller 110 provides bias and control signals via line 112 to the detector array 106 and also operates a rotating mechanical chopper wheel 104. The chopper periodically interrupts the IR radiation to the detector array 106. The interruption is timed for and synchronized with the production of each video frame. The polarity signal from the head goes to the video processor, which uses it to determine when to invert the video output.

Helmet Mounted Display and Voice Control

An IR camera head 20 (FIGS. 1 & 1A) which has an objective lens, focal plane array and preamplifier with an approximate weight of 0.25 pound, and a combiner 32 is mounted on the helmet 10. the power supply, main amplifier, electronic board and controller are located within the fireman's uniform. The two elements are connected via a two-way cable 22, and the apparatus in the uniform is connected via a cable 26 to a CRT or LCD display unit 28 mounted on the helmet.

Relay optics 30 projects the IR image from the monitor 28 to the combiner 32. The fire fighter sees not only the IR image but also the visible scene. This allows the fire fighter to operate without the hindrance of a hand held device. To inhance the operation of the display a voice control chip 40 has been added to allow the fireman to choose whether or not he/she wants the IR image projected on the combiner. All operations are hand-free. A microphone 42 is connected to the voice control chip 40 via a cable 44. Headphones 46 are also connected to the system.

Automatic Object Recognition

A neural network on a chip 36 is used to automatically detect and recognize humans, flames, and objects. The human image is displayed in flashing blue color (low temperature) and the fire image is displayed in flashing red color (high temperature). After the image is found, the device will give a beep.

Wireless Image Transmission

The IR images can be sent to the fire truck and headquarters 50 by an antenna 36 on the transmitter and receiver 34, and a transmitter and receiver 54 at the fire station 52. The fire truck and headquarters also can send the building plan, operation manual and instructions to the fire fighter through the antenna and display them on the combiner 32.

Alternative Embodiment of the Helmet Mounted Display

Figure 2:
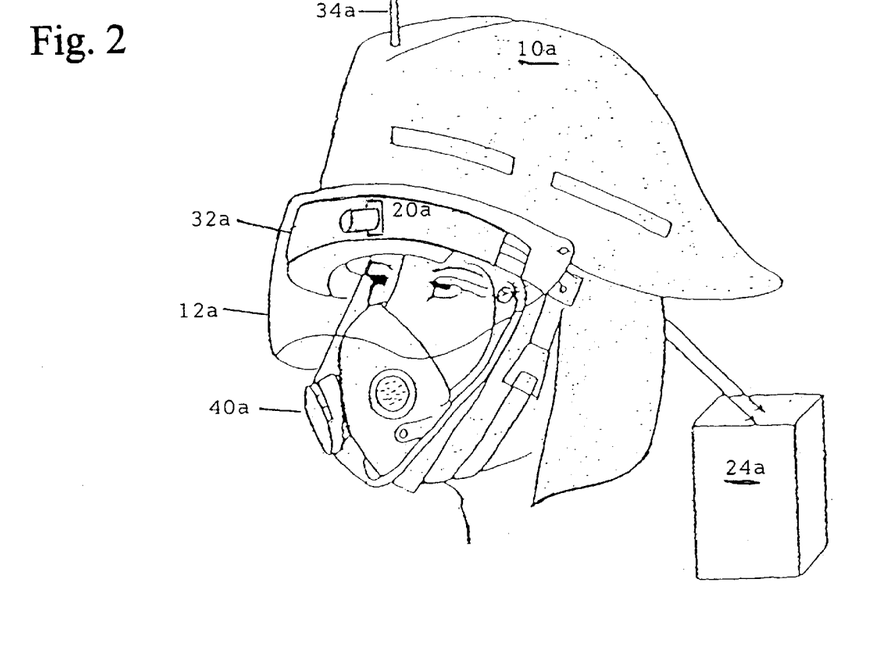
FIG. 2 is an alternative embodiment of the imaging system of FIG. 1, in which the infrared camera is mounted in front of the display apparatus.
Figure 2A:
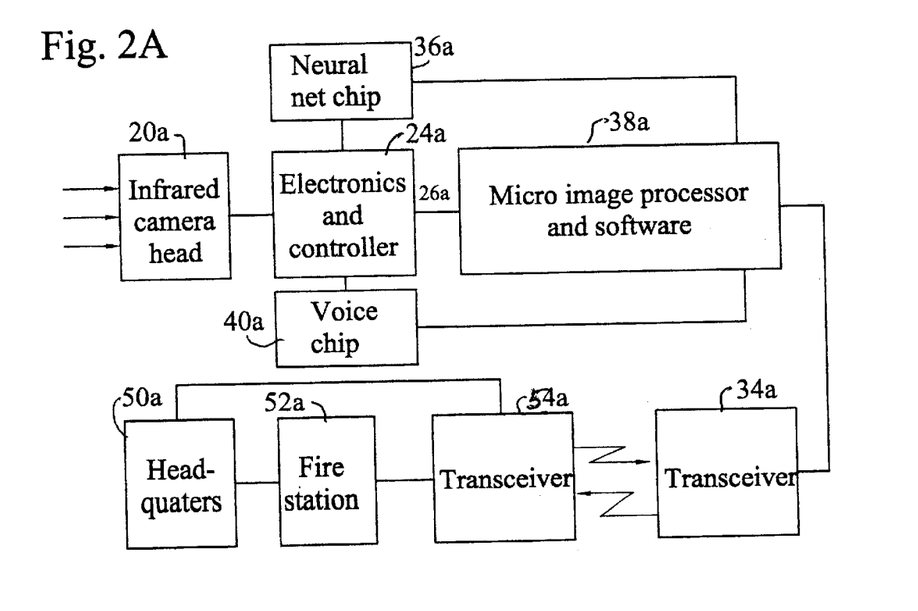
FIG. 2A is an alternative embodiment of the block diagram of FIG. 1A, for use with FIG. 2.

An alternative embodiment of the helmet mounted display is shown in FIGS. 2 and 2A. In this embodiment, on the helmet 10a, the infrared camera 20a is mounted in front of the display 31a and centered, which eliminates a problem with parallax. The infrared unit is connected to an electronic package and power supply 200a.

FIG. 2a shows the infrared camera head 20a connected to a electronics and controller unit 24a, which in turn is connected to a micro image processor and software unit 38a. A neural net chip 36a and a voice chip 40a are connected between the unit 38a and the electronics and controller unit 24a. As in FIG. 1, transmitter and receiver units 34a and 54a are used to connect couple the helmet system to a fire station 52a and headquarters 50a.

B. SYSTEM DESIGN

FIGS. 1 and 1A show a passive infrared imaging system configuration for fire-fighting applications; with FIG. 1 showing a helmet 10 having a visor 12, and FIG. 2 being a block diagram of the system. The system includes the following major components: Uncooled Infrared Imager, Video Processor, Neural Image Recognition Network, Helmet Mounted Display and Combiner, Voice Control and Wireless Image Transmission Unit.

Uncooled Infrared Imager

A block diagram of the uncooled infrared imager system is shown in FIG. 1A. A description of the major components are as follows:

Waveband—In order to detect and recognize flames and human beings in the presence of heavy smoke and dust, the waveband of the infrared radiation is selected from 2 $\mu$m to 12 $\mu$m. The materials of the objective lens and the detector window must be transparent for this waveband.

Chopper—The IR radiation signal from flames and human beings must be converted to an AC signal to increase the signal to noise ratio (S/N). Current choppers are opaque chopper made of thin metal or plastic and have an open spiral pattern. The detector views the scene through the cut-out and views the chopper itself during the closed mode, therefore the detector can generate a signal that represents the difference in temperature between the apparent chopper temperature and the scene temperature during one video field time period (60 Hz). The resulting signal is the opposite polarity in adjacent fields.

Detector—The required uncooled detector is Focal Plane Array (FPA) with 120×160 pixels. The basis for selecting a low resolution format was to reduce the weight and cost of the imager. The IR imager must be mounted on a helmet. The IR imager must not require cooling, therefore an uncooled thermal FPA made of Barium Strontium Titanate (BST) should meet the requirements for fire fighting applications. The detector sensitivity can be enhanced by fast optics (such as F$\approx$1). A one-stage Thermoelectric Cooling (TEC) device and a temperature sensor are used for temperature stabilization at the optimum detector operating temperature (near room temperature 295 K) for peak performance.

Staring Focal Plane Array (FPA) Circuit

Figure 4:
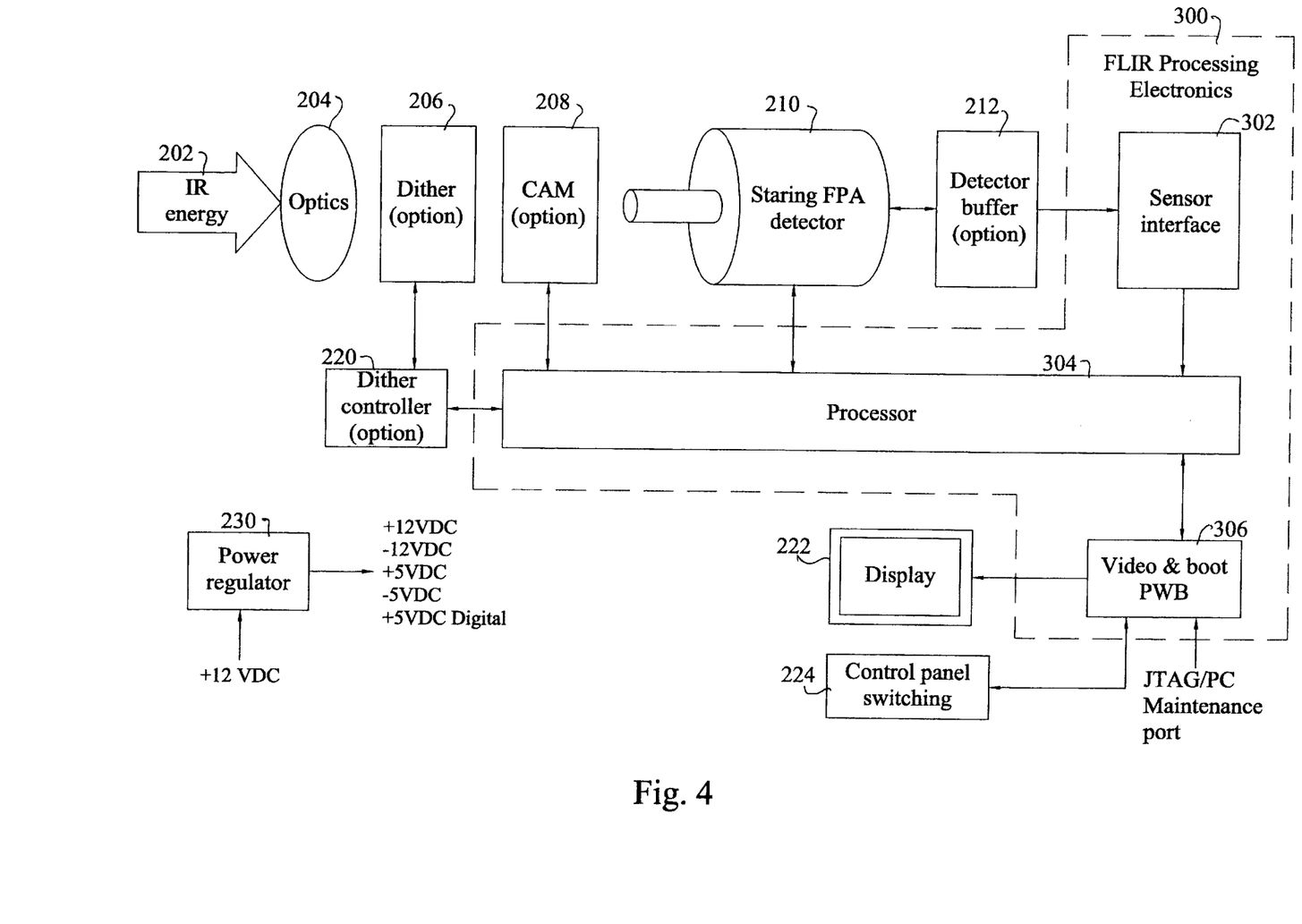
FIG. 4 is a functional Block Diagram of the Staring FPA circuit including interface with processing unit and display module.

A functional Block Diagram of the Staring FPA circuit including interface with processing unit and display module is shown in FIG. 4. Infrared energy 202 from the target after passing through the radiation collecting Optics 204 (window, objective lens and detector interface lens), Dither 206 (optional) and controlled Aperture Modulator 208 (CAM optional) goes to the staring FPA Detector 210 (uncooled or thermally cooled). The FPA signals are multiplexed and sent to the Detector Buffer 212 where they are separated into two paths. The analog signals are sent to the FLIR Processing Electronics 300. The Sensor Interface Circuit converts the analog signals to digital signals and are paired. In the Processor 304, the pixel pair of raw signals are converted into processed and scaled images and are stored into video memory. The images are produced in RS-170 format by reading the images from video memory and converting the digital signals to analog format on the Video and Boot circuit. The RS-170 formatted video is available for external display via a BNC connector. The digital image data from the video memory, and formatted in video format, can be available in lieu of analog video.

The functions and specification for the other components of the Staring FPA circuit are:

Power Regulator 230 supplies operating voltages: +12 VDC, −12 VDC, +5 VDC, −5 VDC, and +5 VDC digital. This device has two switching regulators, two linear regulators, input balun and filtering, and output filtering. The outputs are analog supply and digital supply voltages.

Controlled Aperture Modulator (CAM) 208 is an optional device. It provides continuous non-uniformity correction. The CAM is programmed and controlled by the FLIR programmable processing electronics mentioned above.

Dither Assemble 206 is also an optional device. It is a micro-scanning device that can be programmed with various dither patterns to improve the effective performance of relatively "sparse" FPAs. As an example, a 120×160 array can be dithered to provide the approximate performance of a 240×320 array. The Dither also can be used to accomplish the "dead" pixel replacement.

Neural image Recognition Network

To distinguish between a human and burning object is a challenging problem that a fireman has to face. The human eye is incapable of identifying a human surrounded by other objects in the presence of smoke and dust.

In a conventional pattern recognition, the feature extractor extracts features from the raw scene. These features are then classified using a pattern classifier such as a Bayesian classifier. Based on this classification of features the object is recognized as being belonging to a certain class.

A more convenient approach is to use a neural network. The network will take the raw data in some form and then use it to extract the features from the raw data automatically. Thus a neural network discovers the algorithm for feature extraction and classification at the same time.

A neural network based identification of humans surrounded by other objects in the presence of smoke and dust from image data is described in a later section.

Helmet Mounted Display

The relative position of the sensor (IR Imager 20) and the display (Combiner 32) is shown in FIG. 1. The majority of the electronic and wireless transmission circuits are installed in a small pocket size package to reduce the weight of the helmet mounted devices. A voice control chip 40 is used to have a hand-free operation.

Wireless Image Transmission

A set of transmitter and receiver 34 are mounted on the fire fighter's shoulder to send the images to the fire truck and receive data from the truck.

C. OPTICAL SYSTEM DESIGN

Figure 5:
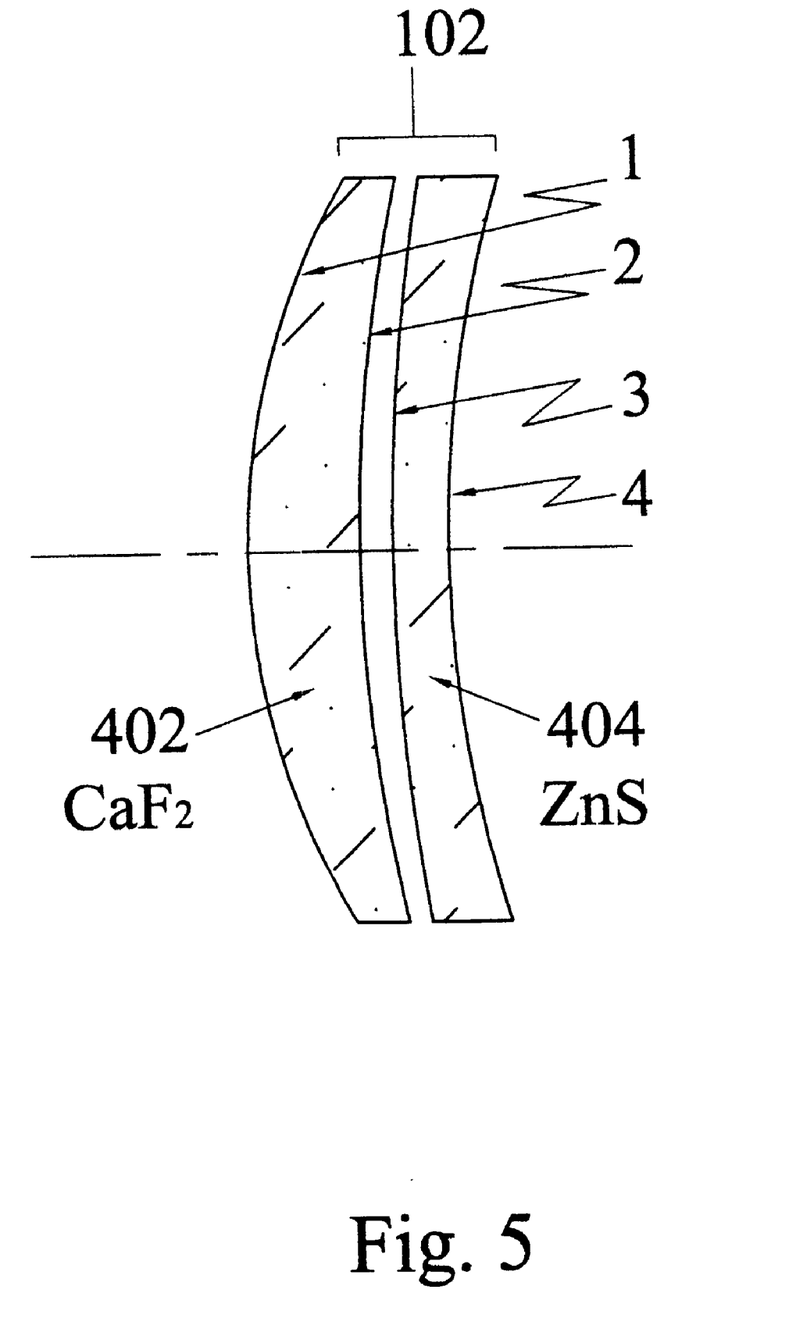
FIG. 5 is a schematic diagram of the objective lens 102 of FIG. 3.

The camera optics 102 of FIG. 3 is shown in FIG. 5. By using computer automatic lens design software, an objective lens was designed which comprises two separated lenses 402 and 404. The first lens 402 is constructed by hot pressed $CaF_2$ The second lens 404 is made by hot pressed ZnS. The two lenses are separated by an air gap to enhance the performance of the objective lens.

The lens design software allows the selection of ten basic lens design parameters for this objective lens formed by the combination of two lenses. These parameters are:

1. curvature $r_1$ of the first face 1 of the first lens 402,
2. spacing $d_1$ of the first lens,
3. refraction index $n_1$ of the first lens,
4. curvature $r_2$ of the second face 2 of the first lens 402,
5. air gap $d_2$,
6. refraction index $n_2$ of the air gap,
7. curvature $r_3$ of the first face 1 of the second lens 404,
8. spacing $d_3$ of the second lens,
9. refraction index $n_3$ of the second lens,
10. curvature $r_4$ of the second face 4 of the second lens.

TABLE 1

The Structure Parameters of the Objective Lens

| Parameter Face | Curvature r mm | Aperture D mm | Spacing d mm | Ref Index n | Material |
|---|---|---|---|---|---|
| 1 | 64.50 | 25 | 2.31 | 1.35 | $CaF_2$ |
| 2 | 52.00 | 25 | 0.51 | 1.00 | Air |
| 3 | 76.90 | 25 | 2.31 | 2.25 | ZnS |
| 4 | 249.00 | 25 | — | — | — |

Since the waveband of the objective lens is large, it is very important to eliminate any chromatic aberration. By careful choosing of the parameters and materials, the designed objective lens is almost chromatic aberration free.

Interface Design of Relay Optics

The infrared image is normally displayed on a cathode ray tube (CRT) or liquid crystal display (LCD) rather than on a combiner. therefore, a optical interface between the cathode ray tube and the combiner is needed.

A shown in FIGS. 1 and 1A, the infrared image is displayed on a CRT or LCD display. The addition of a mirror and a display relay optics between the display and the combiner allows the image to be reflected by 90° from the display to the combiner. The display relay optics component is similar to the optics in an overhead projector. In this case the CRT screen or LCD display becomes the objective plane and the combiner the image plane.

Thin Film coating Design For the Objective Lens

For the objective lens of FIG. 5, designs are needed for the anti-reflection coating and the cut-off reflection coating. Because the refraction index of $CaF_2$ is low, it is not necessary to add an anti-reflection coating on lens 402. However, since ZnS refraction index is high, an anti-reflection coating is necessary on lens 404. The selected anti-reflection coating materials are $SrF_2$ (n=1) and $PbF_2$ (n=1.65). Although $CaF_2$ lens 402 can automatically cut the objective lens wavelengths longer than 12 $\mu$m, wavelength shorter than 2 $\mu$m must be eliminated by the use of short wavelength cut-off filter.

D. ELECTRONIC SYSTEM DESIGN

The focus of the Electronic System Design comprises the circuits for: Staring Focal Plane Array (FPA) Circuit, Video Processing, Thermal Head electronics, Programmable Processor, Erasable Programmable Read Only Memory (EPROM) and Neural Network.

Staring Focal Plane Array (FPA) Circuit

This has been described above.

Video Processing

Figure 6:
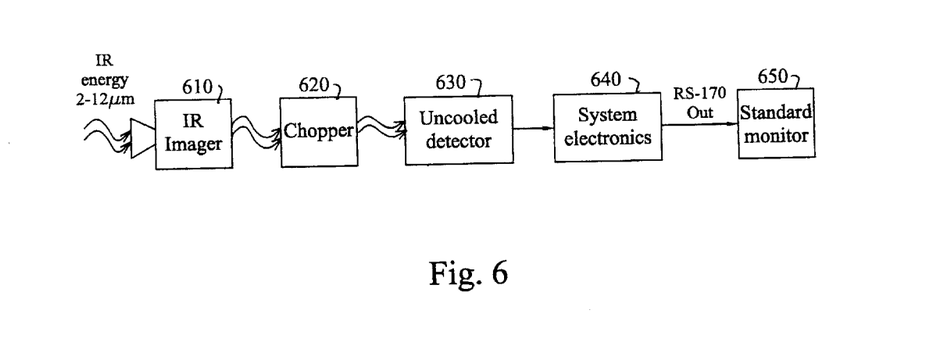
FIG. 6 is a block diagram of a generic uncooled IR imaging system.
Figure 7:
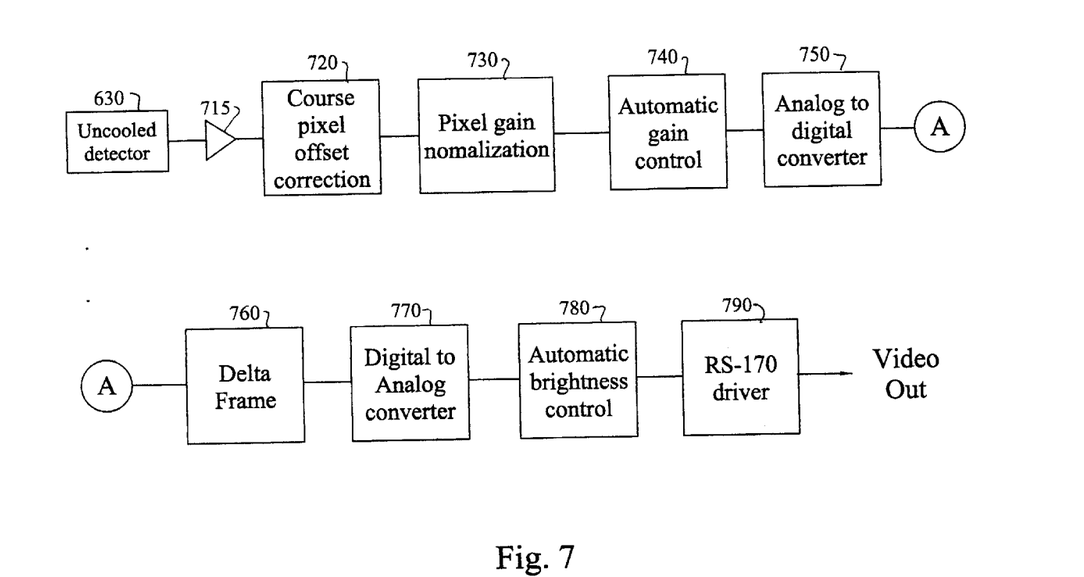
FIG. 7 is a video processing block diagram.

The block diagram of the generic uncooled IR imaging system is shown in FIG. 6. The video processing block diagram is shown in FIG. 7.

In FIG. 6, IR energy in the band 2–12 $\mu$ band passes through an IR imager 610 and a chopper 620 to an uncooled detector 630. The signal from the detector 630 is processed by the system electronics 640, and goes via an RS-170 connection to a standard monitor 650. The system electronics 640 of FIG. 6 is shown in more detail in FIG. 7. It comprises an amplifier 715, a course pixel offset correction circuit 720, a pixel gain normalization circuit 730, an automatic gain control 740, an analog to digital converter 750, a delta frame circuit 760, a digital to analog converter 770, an automatic brightness control circuit 780, and an RS-170 driver 790.

A signal from the FPA is enlarged by the amplifier 715. The uncooled FPA video signal requires unique processing. Each field time of video contains a complete readout of the array. Each pixel of this field has both a signal and an offset. The offset, fixed pattern or spatial noise is usually different for every pixel, but is the same in all fields. Each pixel has unique offset and gain characteristics.

Course Pixel Offset Correction—After the amplifier 715, there is a course offset subtraction in circuit 720 to reduce the magnitude of the offsets. To do this, offset magnitudes for each pixel are measured, stored in memory and subtracted in real-time from the video signal. A gain normalization stage in circuit 730 is used to eliminate the gain non-uniformity. The stage multiplies the video by a stored correction coefficient. The response of each pixel to a uniform temperature source is measured, an average response for the array is determined and a correction coefficient is calculated for every pixel. This value is stored in memory and used to correct the non-uniformity in real-time. Typically, the range of adjustment is between one-half to two times the average response. Signals from dead or defective pixels are replaced with signals from adjacent good ones.

Delta Frame—In order to process and remove the unwanted detector offsets, the system uses a frame differential video processing stage called Delta Frame (circuit 760). This circuitry uses memory to store and subtract consecutive fields, this subtraction eliminates the offsets, doubles the remaining signal and improves the system S/N by a factor of 1.4142.

Automatic Gain Control and Brightness Control—After the pixel gain normalization there is an automatic gain control in circuit 740, and before the video output there is an automatic brightness control in circuit 780. The purpose of using these circuits is to get better image quality and contrast.

ADC and DAC—Before the Delta Frame circuit 760 a 8-bit Analog-to-Digital converter (ADC) 750 is adopted for image processing. After the Delta Frame, there is a 8-bit Digital-to Analog Converter (DAC) 770—to convert the processed video back to analog and combines RS-170 timing functions for displaying on a monitor 650.

Erasable Programmable Read Only Memory

Overview

Erasable Programmable Read Only Memory (EPROM) or an Electrically Erasable Programmable Read Only Memory (EPROM) chips are used to embed operation commands, pattern recognition, image colorization, IR Imager control and video recorder control.

An EPROM has a floating-gate MOS transistor at every bit location. Each transistor has two gates. The "floating" gate is unconnected and is surrounded by extremely high-impedance insulating material. To program an EEPROM, the programmer applies a high voltage to the nonfloating gate at each bit location where a 0 is to be stored. This causes a breakdown in the insulating material and allows a negative charge to accumulate on the floating gate. When the high voltage is removed, the negative charge remains.

During read operations, the negative charge prevents the MOS transistor from turning on when it is selected.

When the chip is exposed to the UV light through a quartz window, the insulating material surrounding the floating gate becomes slightly conductive and all instructions are erased.

EEPROMs are similar to EPROMs, except that individual stored bits can be erased electrically.

EEPROM's cost is lower that the EPROM. EEPROMs are limited to the number of reprogramming actions—typically 10,000 times.

Operation Commands and Pattern Recognition

All operation commands and pattern recognition algorithms will be embedded in EPROM or EEPROM chips.

Image Colorization

Since the temperature of fire is higher than human being and other objects, a very simple software algorithm can be programmed into the EPROM chips to automatically color the fire in red, people in blue and other objects in other colors. When the fire-fighter sees a flashing red area in the picture, he will immediately know that there is a fire in the area.

Voice Control

Existing IR imagers do not allow the fire fighter to see the infrared images and visible objects at the same time. By using a combiner similar to the "head up display" for pilots, the fire fighter will be able to detect visible images and infrared images on the combiner at the same time. To activate the IR imager system, "Voice Control" will be used through the use of a EPROM chip (e.g. HM2007 from HUALON Microelectronics Corp.) to control the IR imager switch. At the word "ON", the switch of IR imager will be activated and the IR images will be projected from the CRT or LCD combiner. The word "OFF" will switch the IR imager off removing the IR image and returning the combiner to clear glass configuration.

Video Tape Player and Wireless Document Transmission

In addition to the IR image we will provide the addition of structural drawings, equipment manuals, fire fighting instructions and other applicable items to the display capabilities of the combiner.

Similar to the "head up display", the preceding information can be displayed on the monitor and projected on the combiner from a small video tape recorder.

If a video tape player is not equipped, the fire fighter can ask the fire truck or headquarters to send the building map and other documents to him by antenna and display them on the combiner.

What is claimed is:

1. An infrared imaging system including apparatus for mounting on a helmet comprising:

an infrared camera head mounted on said helmet for converting infrared light images into electronic signals;

a display unit mounted on said helmet for converting electronic signals into visible light images;

electronic means coupled between the infrared camera and the display unit, including controller means, for processing video signals from the infrared camera and supplying them to the display unit;

a combiner mounted on said helmet so that it is in front of the eyes of a user when the helmet is worn, so that the user can directly view an external scene;

relay optic means mounted on said helmet to couple light images from the display unit to the combiner, whereby the user can view an image from the display unit as well as the external scene;

wherein said infrared camera comprises camera optics, a chopper, and a detector having a staring focal plane array (FPA), the infrared camera having a waveband of infrared radiation selected to be in a range from 2 $\mu$m to 12 $\mu$m, the camera optics and detector having an objective lens and detector window which are transparent for said waveband;

wherein the objective lens comprises first and second lenses separated by an air gap, with first and second faces on the first lens, and third and fourth faces on the second lens, the first lens being constructed by hot pressed $CaF_2$, and the second lens being made of hot pressed ZnS;

wherein the objective lens is designed with ten basic lens design parameters for this objective lens formed by the combination of two lenses, these parameters being:

1. curvature $r_1$ of the first face,
2. spacing $d_1$ of the first lens,
3. refraction index $n_1$ of the first lens,
4. curvature $r_2$ of the second face,
5. air gap $d_2$,
6. refraction index $n_2$ of the air gap,
7. curvature $r_3$ of the third face,
8. spacing $d_3$ of the second lens,
9. refraction index $n_3$ of the second lens,
10. curvature $r_4$ of the fourth face 4, these parameters being as shown in the following table:

| Parameter Face | Curvature r Mm | Aperture D Mm | Spacing d mm | Ref Index n | Material |
|---|---|---|---|---|---|
| 1 | 64.50 | 25 | 2.31 | 1.35 | $CaF_2$ |
| 2 | 52.00 | 25 | 0.51 | 1.00 | Air |
| 3 | 76.90 | 25 | 2.31 | 2.25 | ZnS |
| 4 | 249.00 | 25 | — | — | — |

2. An infrared imaging system according to claim 1, wherein, since the waveband of the objective lens is large, it is very important to eliminate any chromatic aberration, the designed objective lens being made almost chromatic aberration free by careful choosing of parameters and materials.

3. An infrared imaging system according to claim 2, wherein, since ZnS refraction index is high, an anti-reflection coating is used on the second lens (404), the anti-reflection coating materials being selected from $SrF_2$ (n=1) and $PbF_2$ (n=1.65), wherein the $CaF_2$ material of the first lens (402) automatically cuts wavelengths longer than 12 $\mu$m, and a short wavelength cut-off filter is provided to eliminate wavelengths shorter than 2 $\mu$m.

4. An infrared imaging system according to claim 2, wherein said focal plane array is an uncooled thermal focal plane array made of Barium Strontium.

* * * * *